(12) United States Patent
Brown, Jr. et al.

(10) Patent No.: US 6,231,946 B1
(45) Date of Patent: May 15, 2001

(54) STRUCTURAL REINFORCEMENT FOR USE IN A SHOE SOLE

(76) Inventors: Gordon L. Brown, Jr.; Bentley A. Brown, both of 1046 Lady's La., Anderson, SC (US) 29621; Jeffery E. Milliman, 1922 Augusta Rd., Suite 110, Greenville, SC (US) 29605

( * ) Notice: Subject to any disclaimer, the term of this patent is extended or adjusted under 35 U.S.C. 154(b) by 0 days.

(21) Appl. No.: 09/479,522

(22) Filed: Jan. 7, 2000

Related U.S. Application Data (60) Provisional application No. 60/116,075, filed on Jan. 15, 1999.

(51) Int. Cl.[7] .................................................. B32B 5/12
(52) U.S. Cl. ..................... 428/108; 428/140; 428/107; 428/109; 428/110; 428/114; 428/113; 404/134; 404/70
(58) Field of Search .................................. 428/36.1, 34.5, 428/108, 107; 442/43, 58; 404/134, 70; 264/244

(56) References Cited

U.S. PATENT DOCUMENTS

| | | |
|---|---|---|
| Re. 32,698 | 6/1988 | Brown . |
| 2,634,603 | 4/1953 | Byars et al. . |
| 2,644,250 | 7/1953 | Ciaio . |
| 2,766,158 | 10/1956 | Rinecker . |
| 2,812,570 | 11/1957 | Petersilie et al. . |
| 3,397,626 | 8/1968 | Kornick et al. . |
| 3,461,575 | 8/1969 | Tead et al. . |
| 3,844,822 | 10/1974 | Boss et al. . |
| 4,088,708 | 5/1978 | Riew . |
| 4,168,924 | 9/1979 | Draper et al. . |
| 4,186,499 | 2/1980 | Massok, Jr. et al. . |
| 4,223,458 | 9/1980 | Kihara . |
| 4,242,779 | 1/1981 | Curinier et al. . |
| 4,379,798 | 4/1983 | Palmer et al. . |
| 4,413,391 | 11/1983 | Renjilian et al. . |
| 4,510,198 | 4/1985 | Rheaume . |

(List continued on next page.)

FOREIGN PATENT DOCUMENTS

| | | |
|---|---|---|
| 1 240 873 | 8/1988 | (CA) . |
| 1 479 974 | 7/1969 | (DE) . |
| 23 57 557 | 4/1975 | (DE) . |
| 31 20 661 | 12/1982 | (DE) . |
| 0 241 803 | 10/1987 | (EP) . |
| 0 297 006 | 12/1988 | (EP) . |
| 0 318 707 | 6/1989 | (EP) . |
| 0 387 968 | 9/1990 | (EP) . |
| 0 637 658 | 2/1995 | (EP) . |

(List continued on next page.)

OTHER PUBLICATIONS

Road Runner Catalog, Summer 1999, Mizuno® Wave Rider, p. 71, Item H.

(List continued on next page.)

*Primary Examiner*—Paul T. Sewell
*Assistant Examiner*—Troy Arnold
(74) *Attorney, Agent, or Firm*—Alston & Bird LLP (57) ABSTRACT

A structural reinforcement in the form of an open gridwork which is advantageously used, for example, as part of a shoe sole. The structural reinforcement provides and/or enhances spring-like characteristics of the member it is reinforcing, propels and encourages the natural foot strike of the user to length the user's stride, increases the stride speed, and stabilizes the user's foot to prevent permanent compression of the midsole as a result of creep. The gridwork is impregnated throughout with a fully cured or B-stage thermosettable resin. The gridwork includes at least one continuous filament selected from the group consisting of glass, carbon, and aramid. The open gridwork is flat, corrugated, or double corrugated. The corrugated gridwork may be sinusoidal. The open gridwork may be part of a shoe midsole or may constitute a shoe midsole.

15 Claims, 6 Drawing Sheets

U.S. PATENT DOCUMENTS

| | | |
|---|---|---|
| 4,608,768 | 9/1986 | Cavanagh . |
| 4,617,219 | 10/1986 | Schupack . |
| 4,628,621 | 12/1986 | Brown . |
| 4,651,445 | 3/1987 | Hannibal . |
| 4,654,984 | 4/1987 | Brown . |
| 4,680,213 | 7/1987 | Fourezon . |
| 4,688,338 | 8/1987 | Brown . |
| 4,699,542 | 10/1987 | Shoesmith . |
| 4,706,430 | 11/1987 | Sugita et al. . |
| 4,725,485 | 2/1988 | Hirokawa . |
| 4,729,179 | 3/1988 | Quist, Jr. . |
| 4,774,954 | 10/1988 | Ibrahim . |
| 4,819,395 | 4/1989 | Sugita et al. . |
| 4,902,548 | 2/1990 | Cholat-Serpoud et al. . |
| 4,910,076 | 3/1990 | Ando et al. . |
| 4,957,390 | 9/1990 | Shoesmith . |
| 4,966,801 | 10/1990 | Becker et al. . |
| 4,996,816 | 3/1991 | Wiebe . |
| 5,022,168 | 6/1991 | Jeppson, III et al. . |
| 5,025,605 | 6/1991 | Sekijima et al. . |
| 5,052,130 | 10/1991 | Barry et al. . |
| 5,110,627 | 5/1992 | Shoesmith et al. . |
| 5,158,821 | 10/1992 | Gebauer et al. . |
| 5,237,758 | 8/1993 | Zachman . |
| 5,246,306 | 9/1993 | Shoesmith et al. . |
| 5,273,804 | 12/1993 | Brian et al. . |
| 5,285,583 | 2/1994 | Aleven . |
| 5,319,867 | 6/1994 | Weber . |
| 5,372,868 | 12/1994 | Prewo et al. . |
| 5,401,564 | 3/1995 | Lee et al. . |
| 5,463,824 | 11/1995 | Barna . |
| 5,584,130 | 12/1996 | Perron . |
| 5,595,795 | 1/1997 | Alfred . |
| 5,651,848 | 7/1997 | Cohee et al. . |
| 5,836,715 | 11/1998 | Hendrix et al. . |
| 5,888,608 | 3/1999 | Tsai . |

FOREIGN PATENT DOCUMENTS

| | | |
|---|---|---|
| 777 982 | 6/1997 | (EP) . |
| 2 048 971 | 12/1980 | (GB) . |
| 2 173 152 | 10/1986 | (GB) . |
| 2 191 115 | 12/1987 | (GB) . |

OTHER PUBLICATIONS

Road Runner Catalog, Summer 1999, Saucony® G.R.I.D.™ SWERVE IT, p. 84, Item A.

Road Runner Catalog, Summer 1999, Saucony® 3D G.R.I.D.™ Hurricane '99, p. 84, Item B.

Misuno® WAVE™ RIDER advertisement (2 pages), date unavailable.

The Petromat System, 6 page brochure, Phillips Fibers Corp. as least as early as 1995.

STRUCTURAL REINFORCEMENT FOR USE IN A SHOE SOLE

CROSS REFERENCE TO RELATED APPLICATION

This application claims the benefit of U.S. Provisional Application No. 60/116,075, filed Jan. 15, 1999.

FIELD OF THE INVENTION

The present invention generally relates to a resilient, flexible structural reinforcement which may be used in or as a replacement for a resilient cushioning material, such as a shoe midsole, to provide a spring for storing and releasing energy in a manner beneficial to the user. The invention also relates to structurally reinforced shoe soles, midsoles, and to shoes incorporating such soles.

BACKGROUND OF THE INVENTION

Shoe soles, e.g., athletic shoe soles, must be flexible and typically include a patterned, ground engaging, tread layer or outsole, a midsole consisting of highly resilient porous material, and an innersole. The midsole of athletic shoes is typically formed of a softly elastic material such as foamed polyurethane or an ethylene-vinyl acetate copolymer. A softly elastic material is provided to absorb impact associated with movement of the user's foot such as walking, running, jumping, etc., and to provide a cushioning effect to the user's foot.

Although shoe midsoles must be flexible, they must nonetheless be stable to prevent a less than ideal foot strike which often results in over-supination or over-pronation of the user's stride. Over-supination or over-pronation occurs when the user's foot strikes the ground at an angle relative to the horizontal axis. Stated differently, the inside or outside of the user's foot bears the impact as the foot strikes the ground as opposed to the impact being uniformly distributed across the user's foot. This, in turn, may result in injuries to the user's joints.

It is desirable for shoe soles to relieve stresses that are imposed on a human foot during activities such as athletic activities by providing a spring arrangement. The spring arrangement stores and releases energy caused by compression of the midsole when portions of the foot (i.e., the heel and ball of the foot) impact upon the ground. The stored energy, which compresses the midsole, may be returned to the user's benefit while also assisting to avoid overuse injuries caused by repetitive impact to the body joints as the foot strikes the ground. A problem associated with shoe midsoles is wear due to creep. Creep is caused by strain experienced by the sole, e.g. the midsole, when subjected to repetitive, applied stress and results in a permanent deformation and loss of resiliency in the midsole. Creep may be particularly imminent with a less than ideal foot strike, e.g., supination or pronation of the foot. As a result, the midsole may no longer be flat when only a portion of the midsole experiences creep due to uneven repetitive stress. In turn, the useful life of the midsole is diminished thereby decreasing the life of the shoe.

SUMMARY OF THE INVENTION

In accordance with preferred embodiments of the present invention, a flexible structural reinforcement is provided for storing and releasing energy and providing stability and structured resiliency characteristics to the member it is reinforcing. Preferably, the structural reinforcement is placed within or as part of a midsole or as the midsole to provide a lightweight reinforcement for reinforcing a shoe sole to maximize its useful life. For the sake of illustration, use of the structural reinforcement within a shoe midsole will be described, but it is to be apparent that the structural reinforcement described herein has many applications in addition for a use in a shoe midsole. For example, the gridwork may serve as the midsole of the shoe sole. Thus, an outsole and an innersole may be positioned on opposing sides of the gridwork, thereby eliminating the need and expense of the softly elastic material. The structural reinforcement preferably also provides a midsole that returns stored energy resulting from foot impact upon the ground to the user's benefit by providing spring-like characteristics to the sole. A sole possessing spring-like capabilities to propel or encourage the natural foot strike of the user to lengthen the user's stride, increase the stride speed, and stabilize the user's foot and prevent permanent compression of the midsole as a result of creep is also provided by preferred embodiments of the present invention.

According to one embodiment, the invention provides a gridwork comprising sets of warp strands and sets of weft strands which has been substantially impregnated throughout with a thermosettable-B stage or fully cured resin for reinforcing resilient, compressible foam material such as is used in the midsole of shoes, e.g., athletic shoes. Shoe properties such as stored energy return, foot stability, sole expansion and/or wear may be enhanced by employing such a gridwork used in combination with compressible foam material employed in shoe midsoles, especially athletic shoes. This is achieved according to embodiments of the present invention by providing a resilient polymer cushioning material that either encapsulates or is positioned adjacent to a structural reinforcement provided in the midsole that imparts spring-like characteristics to the polymer material. In addition to enhancing various performance characteristics, the structural reinforcement provided in the midsole imparts structural integrity to the midsole contributing to its wear resistance. In preferred embodiments of the present invention, the structural member also stabilizes elongation properties of the midsole to decrease or prevent over-supination and over-pronation, particularly when used as an athletic shoe midsole.

The gridwork comprises a set of warp strands and a set of weft strands disposed at substantially right angles to each other, with each of the strands comprising at least one continuous filament, and with at least some of the strands of each set being spaced apart so as to define an open structure, and with the gridwork being impregnated substantially throughout with a thermosettable B-stage or fully cured resin. According to one embodiment, the gridwork is positioned within or as part of a compressible midsole. Alternatively, the gridwork may form the midsole of the shoe sole without the need for compressible material. One aspect of the present invention provides for a generally flat gridwork. In another embodiment, the set of warp strands of the gridwork is corrugated, e.g., into a sinusoidal configuration, having alternating high and low portions, and wherein the set of weft strands is substantially linear, so that the gridwork has a three-dimensional configuration when formed within the midsole, as part of the midsole, or as the midsole. In yet another embodiment of the present invention, the gridwork has a double corrugated shape consisting of a juxtapositioned pair of corrugated gridwork elements fixedly connected to one another in a face-to-face relationship and the gridwork is positioned within the midsole, as part of the midsole, or as the midsole. According to any one of the aforementioned embodiments, the structural reinforcement is impregnated substantially throughout with a thermosettable B-stage or fully cured resin as described previously so as to interlock the strands at their crossover points and to retain the gridwork in a semi-rigid configuration.

Alternatively, the structural reinforcement may be formed from a grid material. The grid material may be formed of a composite fabric, impregnated with a thermoset resin, and formed to include apertures. The grid material may then be corrugated according to one embodiment and mated with another corrugated grid material to form a double corrugated reinforcement. For the sake of discussion, use of the term "gridwork" encompasses woven and non-woven materials such as a grid material.

According to one preferred embodiment, the gridwork, be it flat, corrugated or double corrugated, may be positioned within the resilient midsole by an injection molding operation which also typically forms the midsole or a relatively resilient composite sheet from which midsoles can be formed. Alternatively, the gridwork may be joined with pre-formed resilient material. With respect to one embodiment of the present invention, the structural reinforcement in the form of a flat gridwork is positioned between layers of pre-formed resilient material or between a layer of pre-formed resilient material and a rubber layer. With respect to another embodiment of the present invention, the structural reinforcement in the form of a corrugated gridwork is positioned adjacent a layer of pre-formed resilient material on one side with discrete members of the pre-formed resilient material positioned beneath the convex portions of the gridwork. A rubber layer may also be used according to this embodiment. According to another embodiment of the present invention, the structural reinforcement member in the form of a double corrugated gridwork may be positioned between pre-formed resilient material layers with pre-formed resilient material preferably being positioned within the cavities defined by the double corrugated configuration. Alternatively, a rubber layer may be used adjacent one surface of the gridwork. According to a further embodiment, the gridwork constitutes the midsole, i.e., compressible material may be eliminated.

The rigidity, resilience, and/or weight of the gridwork may be altered by changing the filament utilized, changing the number of filaments per strand, altering the number of strands per square meter, modifying the grid pattern such as by widening or making more narrow the openings of the open mesh structure, or utilizing different resins. Moreover, the rigidity need not be uniform throughout the gridwork. The stability and spring-like characteristics offered by the structural reinforcement may be varied also by utilizing different resins, or changing the amplitude and/or period of the wave shape of the corrugated reinforcement. These variables are advantageous in the design of structural reinforcements for different end uses or for different end users.

DETAILED DESCRIPTION OF THE INVENTION

The present invention will now be described in detail hereinafter by reference to the accompanying drawings. The invention is not intended to be limited to the embodiments described; rather, this detailed description is included to enable any person skilled in the art to make and use the invention.

Figure 2:
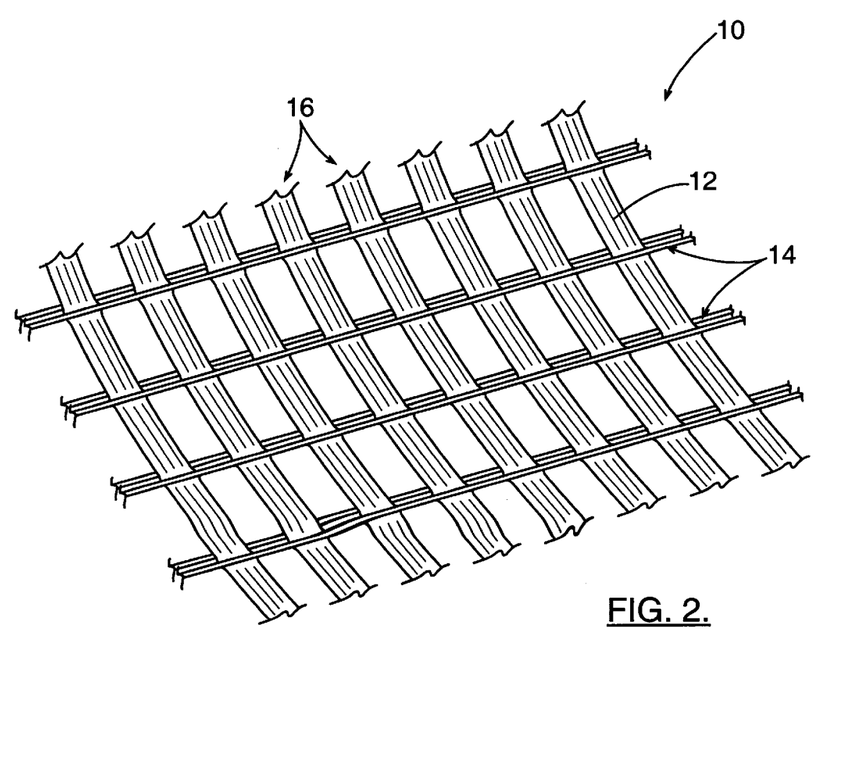
FIG. 2 is a perspective view of a structural reinforcement according to one embodiment of the present invention.

In FIG. 2, a structural reinforcement member 10 for reinforcing a product is shown which embodies the present invention, and which comprises a gridwork 12 comprising a set of warp strands 14 and a set of weft strands 16 disposed at substantially right angles to each other. Each of the strands comprises a plurality of continuous filaments, composed for example of glass, carbon, aramid, or nylon, with glass filaments being the most preferred. An E-type glass is particularly suitable. Any fabric, woven or non-woven could be employed to form the gridwork 12. For example, a non-woven fabric forms the open grid as described in more detail below.

The set of warp strands 14 is separated into groups each containing two contiguous strands in the illustrated embodiment. The set of weft strands 16 is separated into groups, each containing four contiguous strands in the illustrated embodiment. The groups of strands of each set are spaced apart from each other so as to define an open structure. Also, it will be noted that in the illustrated embodiment, one strand of each group of the warp strands lies on one side of the set of weft strands, and the other strand of each group of the warp strands lies on the other side of the weft strands. Thus, the sets of strands are non-interlaced. Also, the resulting superimposition of the warp strands achieves a "pinching or encapsulation" effect of the strands in the weft direction creating a mechanical and chemical bond at the crossover points.

The gridwork 12 is impregnated substantially throughout with a thermosettable B-stage or fully cured resin so as to interlock the strands at their crossover points and maintain the gridwork in a semi-flexible or rigid state. In the semi-flexible state, the gridwork conforms to the shape of the product to be reinforced. The gridwork 12 is designed to be incorporated into a finished product. The material may either be conformed to the shape or the functionality of the midsole 26 and then cured to form a structural composite or it may be fully cured and then positioned within or as part of the midsole 26 or used without compressible material to form the midsole 26. If the material is cured to the B-stage, the process for forming the midsole 26 may be employed to bring the material to the fully cured state. For example, the injection molding process may provide final curing of the material.

The crossover of the strands can form openings of various shapes including square or rectangular which can range from less than an inch up to several, e.g., 2 to 6 inches in grids such as that shown in FIG. 2. The size of the glass fiber bundles in each strand can vary. A range of glass strands with a yield from 1800 yards per pound up to 56 yards per pound can be used. One preferred embodiment is having each group of warp strands composed of two 247 yards per pound superimposed strands, and each group of weft strands composed of four side by side or overlapping strands of 433 yards per pound.

The rigidity of the structural reinforcement member 10 may be modified or enhanced by the type of glass fiber utilized and by the density of the fibers within the gridwork 12. The degree of rigidity may also be altered by altering the grid pattern. The size of the openings between adjacent weft and/or warp strands may be altered. For instance, the larger the openings, the less rigid the gridwork 12 and vice versa. It is not necessary for the gridwork 12 to have uniform characteristics. It may be desirable, e.g., to alter the degree of rigidity of a portion of the gridwork 12 by modifying the fiber selected, the density of fibers in a portion of the gridwork 12, or the grid pattern in a desired portion of the gridwork 12. As such, a non-uniform grid is provided and may be employed, for example, to combat over-supination or pronation.

The gridwork 12 may be constructed using a conventional machine, such as the web production machine disclosed in U.S. Pat. No. 4,242,779 to Curinier et al., the disclosure of which is expressly incorporated by reference herein.

The flat gridwork 12 may be impregnated substantially throughout with a thermosettable B-stage resin so as to interlock the strands at their crossover points and maintain the gridwork, 12 in a semi-flexible state. A B-stage resin is a thermosetting type resin which has been thermally reactive beyond the A-stage so that the product has only partial solubility in common solvents and is not fully fusible even at 150 C.–180 C. Suitable resins include epoxy, phenolic, melamine, vinyl ester, cross linkable PVC, and isophthalic polyester. A common characteristic of all of these resins is that they are of the thermoset family, in that they will cross link into a rigid composite, which when fully cured cannot be resoftened and remolded. They also have the capability to be "B-staged", in which they are not fully cured and can be softened and reshaped either to conform to the shape of the end use product or corrugated into a three dimensional shape as described below. The preferred embodiment will use a urethane epoxy resin applied to the flat open mesh scrim by means of a water emulsion. Advantageously, the resin can be selected or modified to achieve improved chemical bonding or adherence of the gridwork to or within the resilient foam, rubber layer, or the like. Also, the resin may be selected, modified, or enhanced to vary the stiffness characteristics of the resin to enhance the stiffness and spring characteristics of the structural reinforcement 10. For instance, the degree of rigidity of thermosetting resin may be varied to accommodate variations in users' weight, e.g., men and women, adults and children.

A preferred method of producing the gridwork 12 is set forth in U.S. Pat. No. 5,836,715, entitled Structural Reinforcement Member and Method of Utilizing the Same to Reinforce a Product, the disclosure of which is expressly incorporated herein by reference. Once cured, the gridwork 12 is relatively rigid. Such a rigid gridwork 12 would be structurally composed of the same strand configurations and compositions as the flat gridwork impregnated with a B-stage resin, except that the B-stage resin has been advanced to a fully cured C-stage. The resulting rigid state of the gridwork 12 provides added reinforcement to the product.

Figure 3:
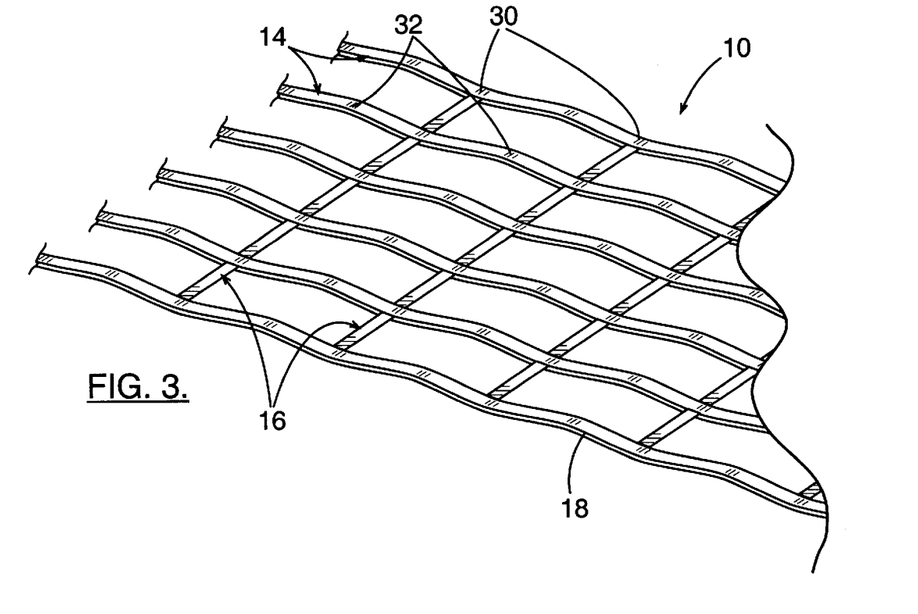
FIG. 3 is a perspective view of a structural reinforcement according to another embodiment of the present invention.
Figure 4:
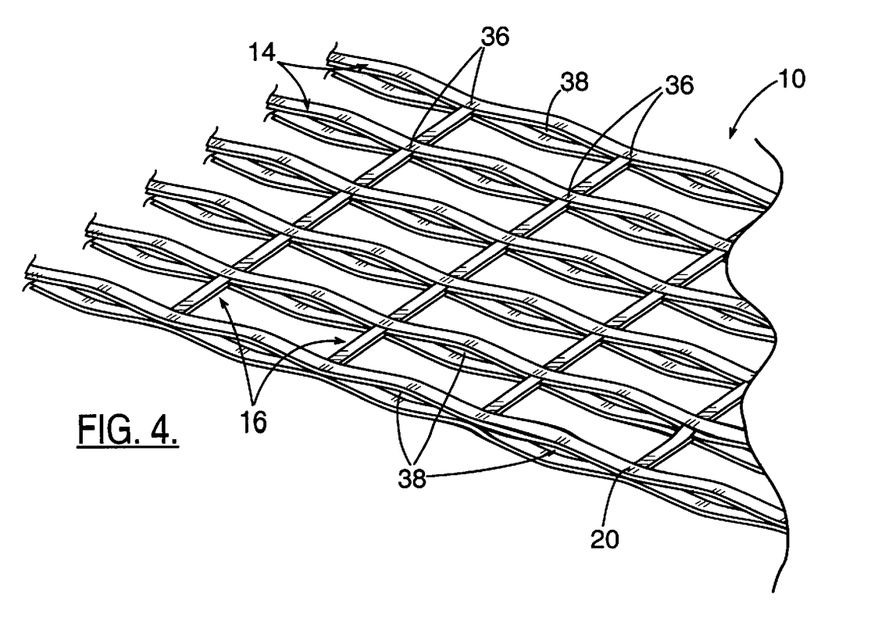
FIG. 4 is a perspective view of a structural reinforcement according to another embodiment of the present invention.
Figure 14:
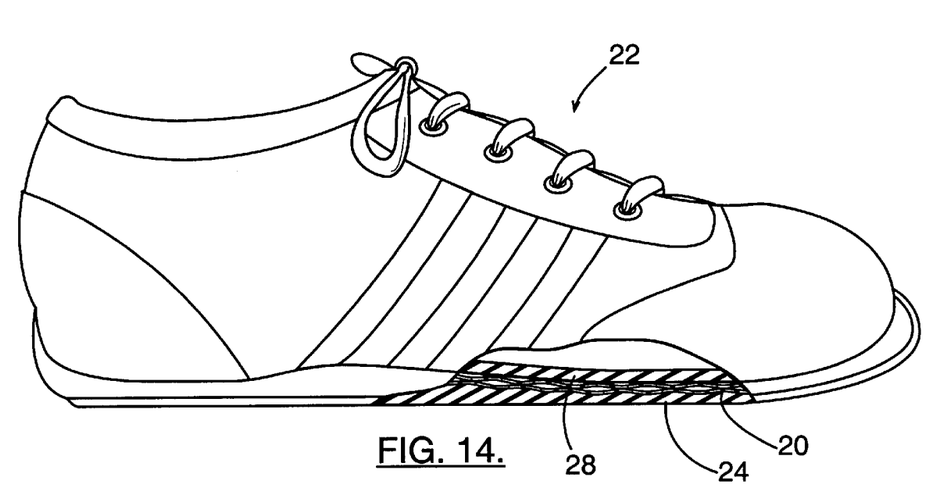
FIG. 14 is a perspective, partially broken away, view of a shoe embodying an embodiment of the present invention.

The structural reinforcement 10 according to the present invention may be alternatively configured and the three embodiments discussed herein for illustrative purposes include a flat gridwork 12 as represented in FIG. 2, a corrugated, three-dimensional gridwork 18 as represented in FIG. 3, and a double corrugated, three dimensional gridwork 20 as represented in FIG. 4. According to each embodiment, the gridwork is similarly formed but the three-dimensional embodiments are further processed as described below. In each instance, the structural reinforcement 10 is positioned either within the midsole 26 of a shoe 22, such as an athletic shoe, as represented in FIG. 1 or as the midsole without compressible material as represented in FIG. 14.

Figure 1:
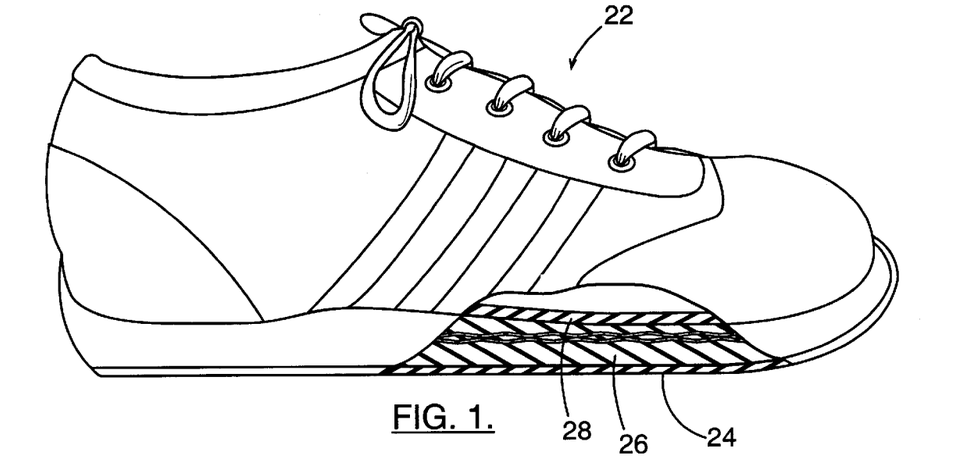
FIG. 1 is a perspective, partially broken away, view of a shoe embodying one embodiment of the present invention.

The athletic shoe 22 illustrated in FIG. 1 includes a patterned, ground engaging, tread layer forming the outsole 24, a midsole 26 consisting of highly resilient porous material, and an innersole 28. The midsole 26 may be formed of a soft elastic and compressible material such as foamed polyurethane or the like. Preferably, the midsole 26 is formed of ethylene-vinyl acetate (EVA). The structural reinforcement member 10 may also be used as the midsole of the shoe as illustrated in FIG. 14. That is, it may be used within a shoe with a reduced amount of or without any soft elastic and compressible material. This thereby decreases shoe weight, sole thickness, and material costs while increasing shoe performance and durability. As illustrated in FIG. 14, the gridwork 12 is positioned between the innersole 28 and the outsole 24.

Figure 5:
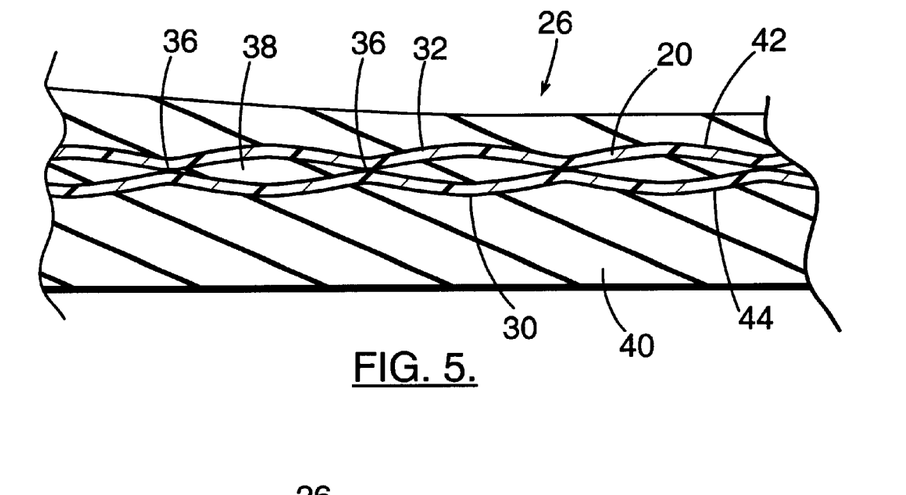
FIG. 5 is a cross-sectional view of a midsole embodying the structural reinforcement of FIG. 4 according to one embodiment of the present invention.
Figure 6:
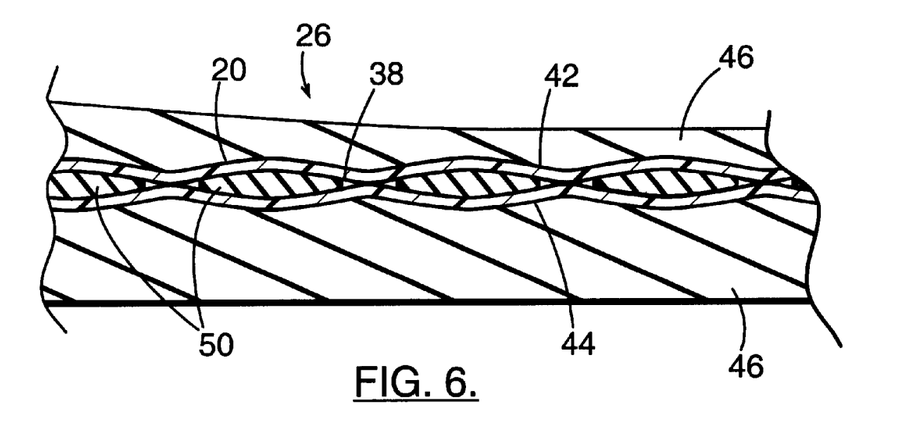
FIG. 6 is a cross-sectional view of a midsole according to an alternative embodiment embodying the same structural reinforcement.
Figure 7:
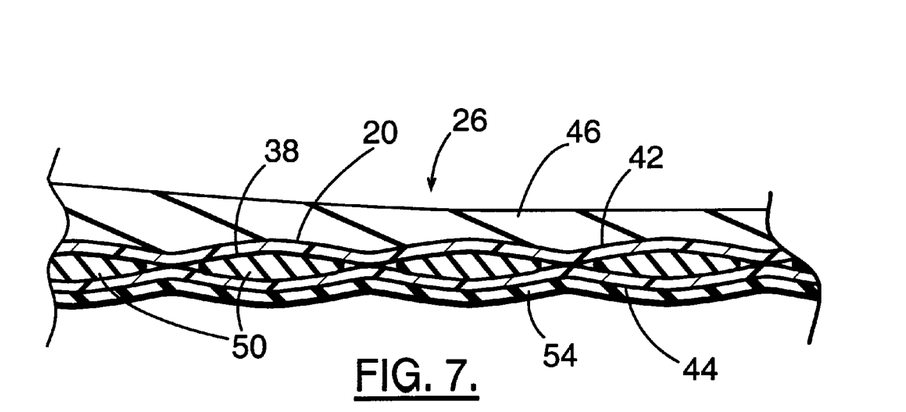
FIG. 7 is a cross-sectional view of a midsole according to another embodiment with the same structural reinforcement.

FIGS. 5–7 illustrate a midsole 26 including a structural reinforcement 10 according to one embodiment of the present invention wherein the gridwork 20 is double corrugated. One each of a pair of gridwork 12 elements is formed as set forth above and then each are further processed. The further processing preferably includes placing each of the flat gridwork elements 12 between two matingly configured, corrugated plates with pressure applied in the presence of heat to soften the gridwork 12.

The corrugated plates are closed to form a single shaped gridwork. As illustrated in FIG. 3, a sinusoidal shaped gridwork is formed. It is to be understood, however, that the gridwork 12 may be configured into any corrugated, three-dimensional configuration. For the sake of illustration and discussion, a sinusoidal configuration is illustrated and described. The corrugated gridwork is removed. More specifically, the set of warp strands 14 is formed into alternating portions, such as low (concave) 30 and high (convex) 32 portions, so as to define a sinusoidal or sinusoidal-like configuration. It is to be appreciated, as used herein, "corrugated" refers to any three-dimensional configuration including non-uniform or non-symmetrical configurations or even configurations having sharper angles than a sinusoidal, smoothly contoured configuration. Each gridwork element is positioned in a face-to-face relationship preferably so that the crossover points of each grid are adjacent one another and so that the high or convex portions 32 face each other in opposing or oppositely extending relationship. An adhesive, such as a polyurethane adhesive, applied where the high and low portions of the upper and lower corrugated gridwork contact (shown at 36), can be used to fixedly secure the pair together. The resiliency of the springs of the double corrugated gridwork 20 is maximized when the two individual corrugated grids are secured with the adhesive wherein the gridwork becomes a single structure. The adhesive or other material or structure used to bond the contact points 36 of the pair of gridwork 20 provides effective load transfer and consequently better spring action. The resulting structural reinforcement member 10 is substantially three dimensionally corrugated so as to define cavities 38 between a high portions 32 of each gridwork 12.

The dimensions of the double-corrugated gridwork 20 may vary uniformly or non-uniformly throughout the grid. The grid height, that is the distance between the high portions 32 of each grid 12 may be any desired height, such as, between ¼ inches and 1½ inches, e.g., about 0.6 to 0.7 inches. For example, the grid height may be greater in the heel portion of the gridwork than the ball of the foot portion in the instance wherein the gridwork 20 extends the length of the shoe.

When the springs are compressed, elongation is permitted in only one direction, namely along the length of the user's foot, that is, in the longitudinal direction. Elongation in the lateral direction, that is, transverse to the length of the foot, is precluded thereby providing stability to the midsole 26. The reinforcement provided by the non-corrugated strands minimizes a less than ideal foot strike such as over-supination and over-pronation due, at least in part, to the inherent strength of the filaments of the structural reinforcement 10. Moreover, the resilient reinforcing member can add to the longevity of the midsole 26 and hence the useful life of the shoe 22, when positioned adjacent to resilient foam material 40 such as EVA. This is because the EVA 40, under normal use, experiences creep due to repetitive compression thereof during use of the shoe 22. The structural reinforcement 10 according the present invention encourages the midsole 26 to assume its original configuration thereby counteracting at least some of the effects associated with creep.

The structural reinforcement member 20 possesses advantageous energy return characteristics. The elongation properties of the gridwork enhance the users performance. For example, upon initial foot impact, that is, contact of the heel to the stepping surface, the effected springs are deflected under the weight of the foot resulting in elongation of the individual springs. The gridwork 20 reverts to its relaxed, or unelongated, condition. As such, it retracts, thereby propelling the user's foot in the forward direction. The energy return forces of the individual springs may be deemed substantially perpendicular, but the energy return forces of the gridwork 20, in use, are generally directed in a direction similar to the foot movement, i.e., in a more forward direction. While not being bound to a particular theory, this benefit is believed to result from a combination of the substantially perpendicular spring deflection and the elongation characteristics of the reinforcement member 10. One of the three illustrated embodiments of forming the midsole 26 with the structural reinforcement 10 as described is represented in FIG. 5. According to this embodiment of the present invention, the structural reinforcement 10 is encapsulated within resilient foam material 40 such as by an injection molding process. Accordingly, foam material 40 surrounds the upper 42 and lower 44 surfaces of the three-dimensional gridwork 20. Foam material 40 also substantially fills the cavities 38 defined by the structural reinforcement 10. This thereby prevents the springs of the structural reinforcement 10 from compressing to the extent that would cause the convex 32 portion of one gridwork 20 to contact the respective convex portion 32 of the adjacent gridwork 20 (assuming a sinusoidal, corrugated configuration) and prevent damaging deformation of the structural reinforcement 10.

An alternative arrangement of forming the midsole 26 includes providing pre-formed layers 46 of foam material 40 which are positioned on opposing upper 42 and lower 44 surfaces of the three-dimensional structural reinforcement 10 as represented in FIG. 6. The pre-formed foam material layers 46 may include a surface for mating with the structural reinforcement, for example, each may include a surface having a correspondingly configured sinusoidal shape. Pre-formed foam material portions 50 may also be positioned within the cavities 38 defined by the three-dimensional structural reinforcement 10 to prevent potentially damaging deformation of the individual springs.

Another alternative midsole is illustrated in FIG. 7. This embodiment includes a pre-formed upper foam layer 46 for mating with the upper surface of the structural reinforcement 10 and a rubber, i.e., natural or synthetic rubber or rubber-like elastomeric, layer 54 on the lower surface 44. The rubber layer 54 may be a discrete layer or may be applied to the structural reinforcement's lower surface as a coating by any known method.

Figure 8:
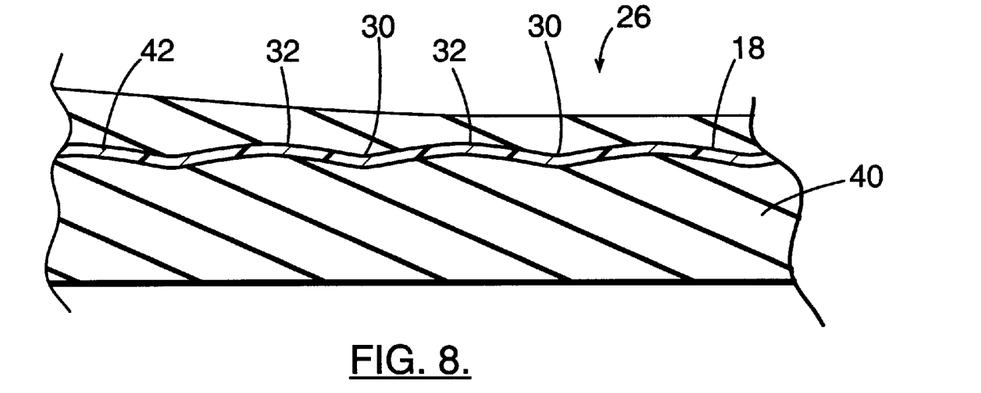
FIG. 8 is a cross-sectional view of a midsole embodying the structural reinforcement of FIG. 3 according to an embodiment of the present embodiment.
Figure 9:
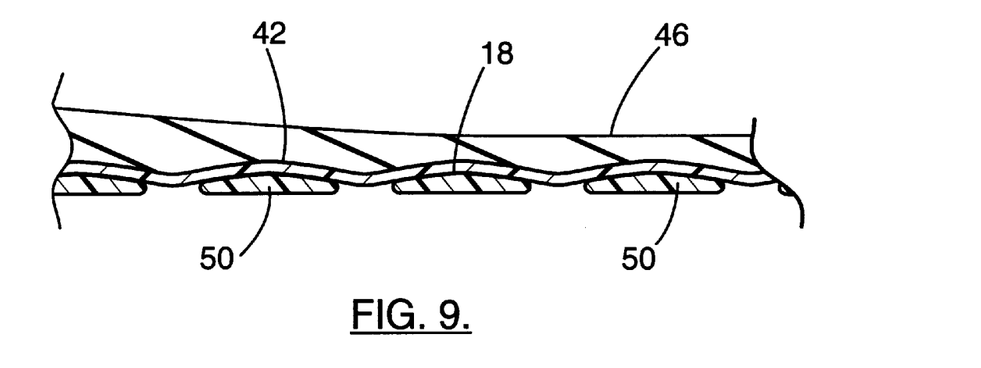
FIG. 9 is a cross-sectional view of a midsole according to an alternative embodiment embodying the same structural reinforcement.
Figure 10:
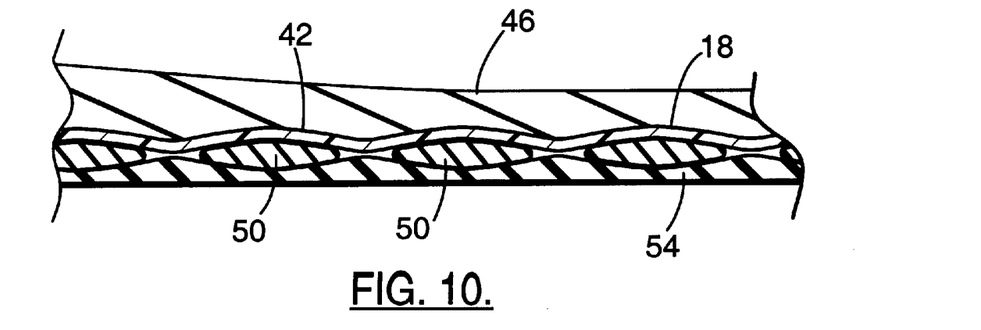
FIG. 10 is a cross-sectional view of a midsole according to an alternative embodiment with the same structural reinforcement.

FIGS. 8–10 illustrate another embodiment of the present invention. According to this embodiment, a single, corrugated, three-dimensional gridwork 18 constitutes the structural reinforcement 10. The gridwork 18 according to this embodiment is substantially the same as one of the pair of gridwork 20 of the structural member illustrated in FIG. 4. The shaped warp strands define low 30 and high 32 portions (concave and convex, as illustrated). The high 32 portions define leaf springs providing the aforementioned benefits.

The cavities 38 of the reinforcement member 10 provide a spring for the midsole 26 akin to a leaf-type spring. The springs thereby absorb the impact of the user's stride, i.e., when the user's heel or ball of foot strike the ground, and release the stored energy in the substantially vertical or "Z" direction to the user's benefit. This may result in an increased stride length, quicker stride as the foot is urged forward upon the heel striking the ground, and reduction in impact experienced by the user's joints such as the feet, ankles, and/or knees. The energy return characteristics of the springs provided by the individual corrugations, combined with the rigidity and elongation properties of the gridwork 18, results in energy return forces directed in a substantially vertical direction and in a forward direction (albeit to a lesser extent that the double corrugated gridwork 20 described above).The dimensions of the gridwork 18 may vary uniformly or non-uniformly throughout the grid. The height, that is, the vertical distance between the upper surface of a high portion and the lower surface of an adjacent low portion, may vary. For example, the gridwork 18 may have a greater grid height in the heel portion relative to the ball of the foot area. The height may, for example, be between ¼ inches and 1-½ inches, such as 0.6 to 0.7 inches.

Like the previous embodiment, the structural reinforcement 10 may be formed with the shoe sole 26 according to the various embodiments. First, the foam material 40 may encapsulate the corrugated, three-dimensional gridwork 18 as represented in FIG. 8. Second, a pre-formed foam layer 46 may be positioned adjacent the upper surface 42 of the gridwork 18 as represented in FIG. 9. Pre-formed foam portions 50 may also be positioned beneath convex portions 32 of the corrugated gridwork 18 to at least slightly limit the compression of the springs of the structural reinforcement 10. Third, a pre-formed foam layer 46 may be positioned adjacent the upper surface 42 of the gridwork 18, pre-formed foam portions 50 may be positioned within the cavities 38 defined by the convex portions 32 of the gridwork 12, and a rubber layer 54 may coat or be positioned adjacent to the lower surface 44 of the gridwork 18. Fourth, the single corrugated gridwork 18 may be positioned between the outsole 24 and innersole 28 without compressible material or at least with a reduced amount of compressible material.

The structural reinforcement 10 illustrated in FIG. 2, described above, according to another embodiment of the present invention also benefits midsole 26 construction. Although the gridwork 12 according to this embodiment is substantially flat, a "spring" nonetheless results, although differently than the other embodiments. A "spring" effect results due to the inherent resiliency of the gridwork 12 when it is bent, that is, subjected to forces in the longitudinal direction. For example, when a user's heel strikes the ground, the sole of the foot, and hence the shoe 22, bends in the longitudinal direction. The structural reinforcement 10 urges the foot forward to counteract the bending forces caused by the foot flexing. Additionally, the structural reinforcement 10 provides stability to the midsole 26 because elongation in the lateral direction is precluded.

Figure 11:
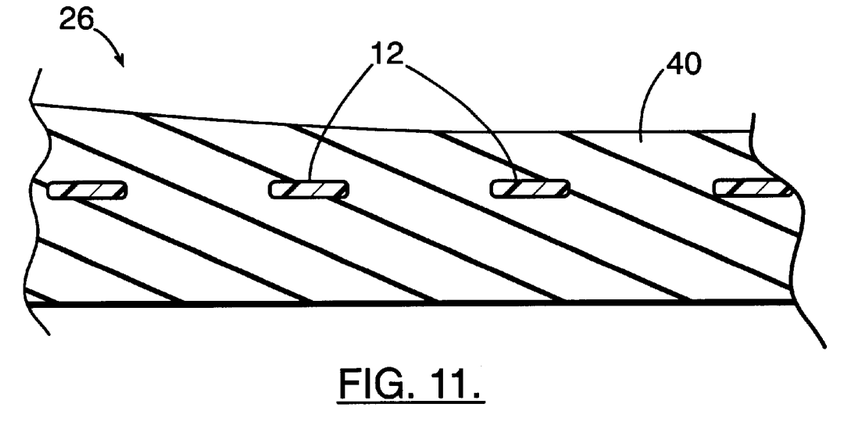
FIG. 11 is a cross-sectional view of a midsole embodying the structural reinforcement of FIG. 2 according to an embodiment of the present invention.
Figure 12:
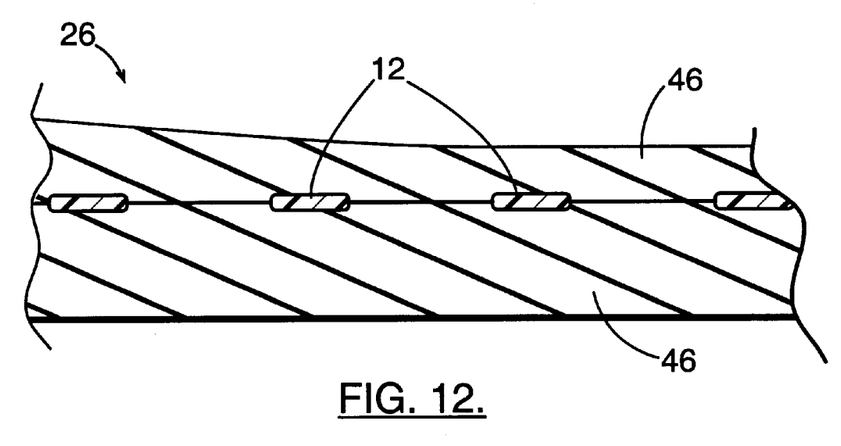
FIG. 12 is a cross-sectional view of a midsole according to an alternative embodiment embodying the same structural reinforcement.
Figure 13:
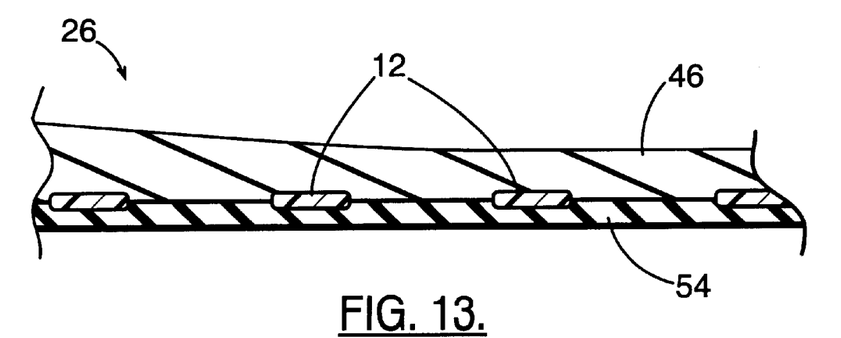
FIG. 13 is a cross-sectional view of a midsole according to another embodiment with the same structural reinforcement.

The gridwork 12 may be formed with the midsole 26 according to one embodiment of the present invention by a variety of manners, three of which are illustrated. First, the structural reinforcement 10 member may be encapsulated with the foam material 40 as represented in FIG. 11 by, e.g., an injection molding process. Second, pre-formed foam layers 46 may be positioned on opposing sides of the structural reinforcement 10 as represented in FIG. 12. Third, a pre-formed foam layer 46 may be positioned adjacent the upper side 42 of the gridwork 12 and a rubber material 54 may be coated or positioned on or adjacent to the lower surface 44 of the gridwork 12 as illustrated in FIG. 13. Fourth, the gridwork 12 may be positioned between the outsole 24 and innersole 28 without compressible material, or at least with a reduced amount of compressible material.

The structural reinforcement members 10 according to the various embodiments, as illustrated in FIGS. 2, 3, and 4, may alternatively be provided above the midsole 26 as a shoe insert (not shown).

The structural reinforcement 10 according to each embodiment is lightweight and does not significantly contribute to the weight of the shoe sole. The number of filaments utilized for each strand and the size of the openings of the gridwork may be altered for specific end uses and such modifications would inherently effect the weight of the structural reinforcement 10. One exemplary structural reinforcement 10 having a width of 5 in. and a length of 16.5 in. has a weight of about 42 grams for a three-dimensional, honeycomb-shaped structural reinforcement. The structural reinforcement 10 of similar size having a sinusoidal three-dimensional configuration has a weight of about 20 grams and a flat structural reinforcement of like size has a weight of about 17.8 grams.

With respect to the corrugated gridwork embodiments, FIGS. 3–10, the pitch and amplitude of the corrugated configuration may be varied to selectively alter the rigidity, spring characteristics, and weight of the gridwork, either uniformly throughout the gridwork 18,20 or at discrete locations, e.g., the heel portion thereof. Grid height can be varied to accommodate restrictions of end products. With respect to all embodiments, grids of varying width can also be provided, for example, the gridwork need not extend the entire width of the shoe sole. Additionally, the gridwork 12,18,20 may be positioned in discrete locations within the midsole 26 and may not extend the entire length of the shoe sole.

Figure 15:
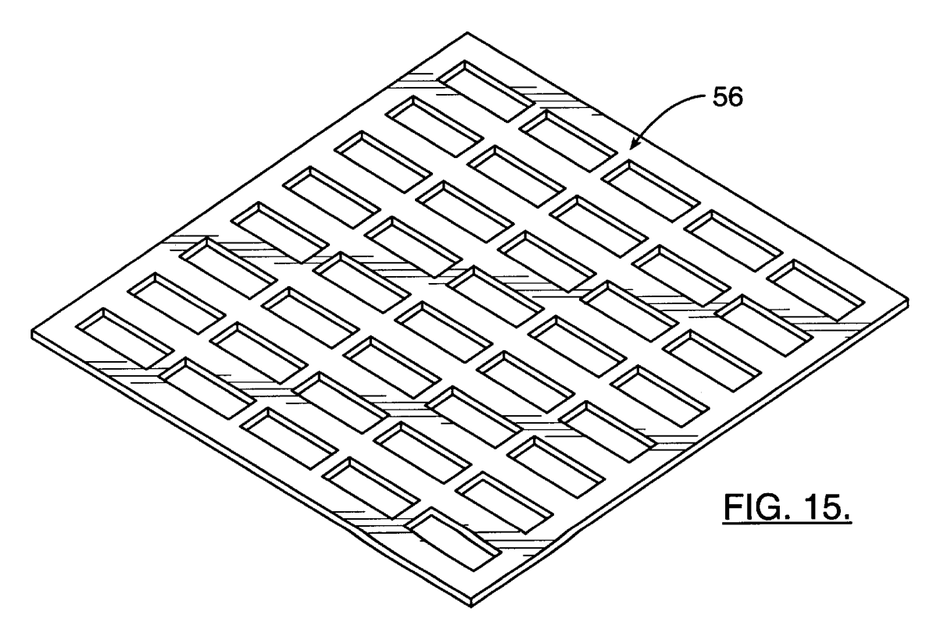
FIG. 15 is a perspective view of a structural reinforcement according to another embodiment of the present invention.

Alternatively, a grid material 56 may form the gridwork 12,18,20. The grid material 56, illustrated in FIG. 15, may be formed of a composite fabric such as one with continuous glass fibers in both the warp and weft directions. The grid material 56 is impregnated with a thermoset resin and either fully cured or cured to the B-stage as described above. The grid material is processed to include apertures to permit the resilient material, according to one aspect of the invention, to be applied therethrough and around. A substantially flat grid material 56 is illustrated in FIG. 15, but it is to be apparent that the grid material may be corrugated and either a single layer of the material or a double corrugated grid material may be formed in the midsole similar to the corrugated embodiments described above and as illustrated in FIGS. 3 and 4. The grid material 56, corrugated or not, may also constitute the midsole, thereby eliminating the need for resilient foam material 26. For instance, the apertures may be die punched, formed with water jets or otherwise cut. The apertures may be variously configured throughout the material 56 or, as illustrated, uniformly configured. The apertures may have various geometric shapes, e.g., oval, circular, rectangular, etc.

According to one embodiment of the present invention, the grid, with a thermosettable B-stage resin as described previously, permits the gridwork to be semi-flexible and conform to the shape of the product to be reinforced. Once the gridwork is conformed to the shape of the product to be reinforced, the B-stage resin would be cured providing added rigidity and enhanced properties to the resulting product. Thus, the gridwork can be conformed to the shape of the product desired to be reinforced and cured in situ using either the heat available in the normal manufacturing process, such as midsole formation, or by heating from an external heat source. The structural reinforcement 10, preferably, is cured to a rigid state prior to incorporation into the midsole.

In the drawings and the specification, there has been set forth preferred embodiments of the invention and, although specific terms are employed, the terms are used in a generic and descriptive sense only and not for the purpose of limitation, the scope of the invention being set forth in the following claims.

What is claimed is:

1. A structural reinforcement comprising:

a double corrugated structural reinforcement in the form of an open gridwork comprising a pair of gridwork elements, each gridwork element being defined by strands extending in a first direction and strands extending in a second direction transverse to said first direction and being impregnated substantially throughout with a thermosettable B-stage or fully cured thermoset resin;

said strands in said first direction being corrugated to define high and low portions, and said strands in said second direction being substantially straight;

said pair of gridwork elements being fixedly connected in opposed face-to-face relationship;

said first and second strands of said gridwork elements being oriented in like directions, respectively, and said high and low portions facing each other in opposing relation so as to define a cavity between each of said opposing high portions of said corrugated strands;

elongation of said reinforcement being allowed in said first direction by said first corrugated strands and being substantially prevented in said second direction by said second straight strands; and said gridwork elements each comprising at least one continuous filament selected from the group consisting of glass, carbon, and aramid.

2. A structural reinforcement according to claim 1 wherein each of said pair of gridwork elements comprises a set of warp strands and a set of weft strands disposed transversely with respect to the warp strands.

3. A structural reinforcement according to claim 1 wherein each of said pair of gridwork elements is formed of a composite fabric.

4. A structural reinforcement according to claim 1 wherein said structural reinforcement has a grid height, defined as a vertical distance between an upper surface of a high portion of one gridwork and a lower surface of an adjacent high portion of the other gridwork, of less than 1.5 inches.

5. A structural reinforcement according to claim 4 wherein said grid height is less than 0.7.

6. A structural reinforcement according to claim 1 wherein said structural reinforcement has a grid height, defined as a vertical distance between an upper surface of a high portion of one gridwork and a lower surface of an adjacent high portion of the other gridwork, which is non-uniform.

7. A structural reinforcement according to claim 1 wherein said elongation occurs in the substantially longitudinal direction.

8. A structural reinforcement according to claim 2 wherein at least some of the strands of each set are spaced apart so as to define an open structure, and wherein the set of warp strands is separated into groups each containing a plurality of contiguous strands.

9. A structural reinforcement according to claim 8 wherein at least one strand of each group lies on one side of the set of weft strands and at least one other strand of each group lies on the other side of the set of weft strands.

10. A structural reinforcement according to claim 1 wherein said thermosettable resin is epoxy resin.

11. A structural reinforcement according to claim 1 wherein said resin is thermosettable B-stage resin selected from the group consisting of epoxy, phenolic, melamine, vinyl ester, cross linkable PVC, and isophthalic polyester so as to maintain the structural reinforcement in a semi-flexible state.

12. A structural reinforcement according to claim 2 wherein the sets of strands are non-interlaced.

13. A structural reinforcement according to claim 2 wherein each of the strands comprises a plurality of continuous glass filaments.

14. A structural reinforcement according to claim 1 wherein resin is a fully cured thermoset resin selected from the group consisting of epoxy, phenolic, melamine, vinyl ester, cross linkable PVC, and isophthalic polyester so as to interlock the strands at their crossover points and maintain the structural reinforcement in a relatively rigid state.

15. A structural reinforcement according to claim 1 wherein each gridwork of said double corrugated structural reinforcement is sinusoidal.

* * * * *